Patented Apr. 19, 1932

1,854,430

UNITED STATES PATENT OFFICE

NELLIE JEAN STRATTON, OF YOUNGSTOWN, OHIO, ASSIGNOR TO THE HONEY CANDY COMPANY OF AMERICA, A CORPORATION OF OHIO

TREATING HONEY

No Drawing.  Application filed May 29, 1930. Serial No. 457,537.

It is the purpose of this invention to produce a product, or composition containing a large proportion of honey without the use of sucrose or commercial glucose, in which honey shall be the major saccharine ingredient, and suitable for the production of other products without having therein the objectionable qualities such as original stickiness or subsequent undue tendency to increasing stickiness, softness or excessive granulation heretofore incident to preparations containing a large proportion of honey, and which, in the case of edibles, shall have the palatable and dietetic values of honey, and without the use of waxes and other objectionable ingredients hereinafter mentioned.

Honey is produced in widely distributed parts of the world in a form which is convenient to handle and to eat. In most instances it needs no elaborate treatment for refining and in most instances the expense of producing honey is very slight. Honey is very sweet and in its usual form consists almost entirely of a solution of sugars in a form which is not only palatable but readily digested. Ordinarily when extracted or separated from the comb or wax in which it is deposited when made, the honey itself is usually a more or less clear and partially transparent liquid. On standing for a time it becomes more or less crystalline, that is, there are formed in the honey liquid upon standing crystals of one or more of the sugars contained in the honey. This makes the honey appear undesirable for ordinary uses and the storing of honey thus has been an unsolved problem. The honey contains water in considerable amount. Its composition varies somewhat with the location in which the honey is made and the source from which the bees get the sugars and also to some extent with the age or ripeness of the honey. It is deliquescent and tends to absorb moisture from the air which keeps it constantly in the liquid sticky form. The use of honey as a sweetening is very considerably limited by the inconvenience of storing and handling and by the sticky, messy condition in which it persists. This is so with respect to honey when used alone but is also the condition when honey is used as a sweetening or other ingredient in the preparation and manufacture of various products. While efforts have been made from time immemorial to employ honey for various purposes because of its desirable cheap sweetening qualities and its ready accessibility, it has been generally impossible to produce a satisfactory commercial article which contains and retains a considerable proportion of honey. While the sweetening effect may be procured by the use of honey it has been generally found that the other and undesirable characteristics of honey persist in the manufactured article, that is, it is sticky or tacky and on standing tends to absorb additional moisture from the air thus increasing the sticky characteristics and tending to produce a melting, dissolving or running of the product. At the same time there is a tendency to form undesirable crystals in the product. This change which takes place in the product after it is made while it may not always be technically injurious, does appear clearly and seems to give the product an appearance of deterioration so that it is not satisfactory to the distributor or consumer. This change which takes place in the honey or in the product containing honey occurs more pronouncedly when freely exposed to the air but also to an undesirable extent when protected as thoroughly as possible from contact with the atmosphere.

It is a purpose of the present invention to treat honey in such a way as to eliminate, hide or destroy its undesirable characteristics while at the same time retaining its desirable characteristics. Honey treated by the process retains its sweetness and so may be used as sweetening in the place of other sugars. At the same time crystallization of the undesirable sort which takes place in untreated honey is avoided. Honey treated by the process is not liquid or syrupy or runny and it or materials treated by it or materials containing it may be allowed to stand even in contact with the atmosphere without absorption of undesirable quantities of moisture. The treated honey or articles treated with or containing it are not sticky or tacky and on standing do not become sticky or tacky nor does the undesirable crystallization take place.

By the present process the honey may be raised to a moderately high temperature and lose its undesirable characteristics and become stable in a relatively dry, more or less solid form at the same time retaining its desirable characteristic taste or bouquet. If the high temperature is maintained for too long a period or if too high a temperature is reached the honey may lose the characteristic taste or bouquet normally inherent in the raw honey. Likewise if a sufficiently high temperature is not reached the mass may revert to substantially its original condition again becoming sticky or tacky and deliquescent like the raw honey.

I have discovered that the results above mentioned can be desirably substantially achieved by the suitable combination of lactose with honey.

In employing my invention, I have found that honey varies with sources of production as to the proportions of its constituent sugars, dextrose and levulose, each as between themselves and as to the total of both, as to water content and incidental ingredients, some of which are not fully determinable, and with the age of the honey as to water content and condition of the sugars; that there may be variations in the lactose in some respects as obtainable commercially; and that the results of combination vary somewhat with atmospheric conditions, equipment used and heat application. A larger major proportion of the original honey ingredient is practicable and desirable for some uses than for others. Accordingly, principles of practice will be stated but definitely exact formulæ for all conditions cannot be given. The particular results desired must be achieved by procuring materials of approximately known characteristics, using them approximately according to applicable formulæ, and securing results desired by the practice of my process under available commercial conditions and within the permissible variations hereinafter explained. The essence of my invention is that my honey basic product may be produced by the combination of honey with lactose with the honey as the major saccharine ingredient under conditions hereinafter explained.

My honey product basically is that resulting from the combination of the honey with lactose and it may be used in the production of other products. My basic product may be produced in heated liquid form and may be applied to further uses in other products while in such form. It may be beaten in a manner well understood in the production of confectionery or combined, without beating, with other ingredients of the desired final product. Crystallization may progressively develop in the further uses of the product of my invention. Where desired, there may be produced an ultimate product with crystallization of such character as not to be unduly sandy or gritty to the touch, or moist and sticky, or become unduly so under normal conditions of handling and keeping, palatable for edible uses, and without a certain cloying sweetness often incident to the use of honey in edibles in the proportions practicable with my invention.

In certain uses where handling with the fingers is not incident to use, a greater proportion of honey may be employed but with possibly more tendency to stickiness and deliquescence. Because of the foregoing facts pertaining to my invention, it is not limited to the conditions or further use of the product thereof succeeding the basic combination of the lactose and the honey under the process of my invention or to the relative proportions of the honey so long as the latter constitutes the major saccharine ingredient; and the essence of my invention is, accordingly, as above stated.

In the preferable process of producing my honey product for the larger variety of uses, I take a given quantity of lactose by weight and dissolve it in a quantity of water sufficient at the boiling point to produce a solution. I find that approximately an equal quantity of water by weight, used at approximately the boiling point of water, is satisfactory. After a solution of the lactose is obtained, I add well ripened extracted preferably clover honey of approximately the best grade commercially obtainable in quantity by weight substantially in excess of the weight of lactose, seeking to substantially standardize the honey ingredient of my manufacture and use approximately such standards throughout my honey compositions. After mixing the honey into the lactose solution, I raise to a boiling point between approximately 220 and 270 degrees Fahrenheit according to the kind and quantity of the honey and use to which the product is to be applied as hereinafter illustrated, and remove from the heat. For many uses, after cooling to around 100 degrees Fahrenheit I further proceed to beat to a creamy consistency by well known methods. If the mixture of lactose solution and honey is not brought to a sufficiently high boiling point or carried to too high a boiling point, recrystallization of the sugar which crystallizes may tend to produce too large and coarse crystals or aggregations of crystals and require mechanical reduction of the crystals or repetition of treatment. The desirable intervening boiling point is determined by the proportion and kind of extracted honey used and the purpose for which the basic product is to be thereafter used.

It has been discovered that generally if the mixture is not raised to a temperature higher than about 220 degrees Fahrenheit there will be a tendency on cooling for reversion or a settling out of the milk sugar. When, however, the mixture is brought to a temperature higher than about 220 degrees Fahrenheit an intimate permanent mixture of the ingredients seems to be produced. Heating may be continued until the temperature of about 270 degrees Fahrenheit or more is reached. It has been observed that if the temperature is allowed to rise beyond about 280 degrees Fahrenheit the mixture seems to be interfered with and on cooling there may be a reversion or undesirable settling out of the milk sugar. The time during which the mixture is kept at the high temperature may be as short as convenient and may vary with the particular purpose for which the mixture is to be used. It has been observed that long continued heating or heating at a high temperature may more or less destroy the pleasant characteristic taste of honey and care should, therefore, be taken in ordinary operation to avoid such a result. Preferably the temperature will be kept below about 270 degrees Fahrenheit.

For a candy "fondant", a use to which I now very largely apply my product, the treatment of fondant in various ways being well known to candy makers, I add the honey in quantity by weight one-fourth to one-half more than the weight of the lactose, depending upon results experienced with similar materials in actual use, and bring to about 236 degrees Fahrenheit, and cool preferably to about 100 degrees Fahrenheit and beat as above. The mixture when cooled will be found of a soft, creamy consistency well known as being desirable in the confectioner's art, and it may be set aside to ripen or it may be delivered directly to molds for the production of fondant in suitable form. The fondant may be used as made or any suitable or desirable flavoring or other ingredients such as nuts or fruits may be added. The molded fondant may be treated in the usual way and provided with any suitable or desired coating such as chocolate, maple or the like. Such a fondant will have to a high degree all the qualities usually desired by the confectioner. It will not stain or leak through a coating. It will not break down or run. It will not unduly crystallize and it will keep for long periods of time without thoroughly drying out or otherwise deteriorating.

Without intending to limit the invention; a specific procedure for making a satisfactory fondant in quantities and proportions commercially convenient may consist in heating about 24 pounds of water. When this reaches the boiling point there is poured into it about 24 pounds of refined impalpable lactose into which has previously been mixed about 6 ounces of white vinegar. The lactose is dissolved in the water by stirring. There is then added about 32 pounds of the best grade of white clover honey and the mass is heated while stirring and brought to a temperature of about 236 degrees Fahrenheit. It is then drawn off onto the water-cooled bed of a beating machine and allowed to cool until it reaches about blood heat when it does not feel hot to the touch. The beater is then started into operation and about an ounce of glycerin is added and the beating continued until there is produced a soft, fine, crystalline mass of fondant. This is removed, placed in a pan, covered with a dry cloth and let stand for about 48 hours. It may then be heated to about 180 degrees Fahrenheit and suitable or desired flavoring, nuts, fruits, etc., added and the liquid fondant may then be poured into the usual starch molds. After casting, it may be let stand 1, 2 or 3 days before coating in the usual way. The specific quantities proportions, times and temperatures above indicated are not essential but may be varied in accordance with the desires of the operator or in accordance with the characteristics of the specific ingredients used or the varying surrounding circumstances such as atmospheric conditions and the like. The vinegar or the glycerine or both may be omitted.

For "caramels" I may increase the proportions of honey to lactose by adding honey of about one and two-thirds the quantity by weight of the lactose and bringing to a boiling point at around 240 degrees Fahrenheit, whereupon there may be added to the composition evaporated milk and natural cream in about equal proportions and in an aggregate quantity by weight about one-half that of the honey originally added, bringing such final mix up again slowly to and a little beyond such 240 degrees Fahrenheit, and, without beating, prepare for use in the customary manner for caramels.

If there be desired a "nougat", which, as marketed, does not require the same soft, smooth and less friable texture as "fondant" candy, and is usually sold after the admixture of mascerated nuts, cocoanut, fruit bits or the like, I may still further increase the relative original content of honey to about two and three-fourths times the lactose and bring the solution to the boiling point of about 250 degrees Fahrenheit, and, upon removal from the fire, add other desired ingredients of a nougat without beating other than as incident to the thorough stirring in of the other materials. Experience discloses that the quantity of honey added should be varied slightly with the character of the materials to be subsequently added in the customary nougat type of candy. I desire to make the honey content relatively as large as possibly consistent with a marketable grained candy. Different of the added materials have a different effect upon the final product in this respect; and the results must be based upon actual experience with the materials.

So called "chews" are desired by the trade in a consistency requiring increased mastication in consumption, and I can use a still larger original proportion of honey, about four times the quantity by weight of the lactose, bringing to a boiling point of about 265 degrees Fahrenheit. To this basic honey product, I add cocoa butter in quantity by weight about one-fourth that of the lactose and evaporated milk about one-half in weight that of the lactose and after mixing pour and cool without beating, cutting and finally preparing in the customary manner.

My treated honey composition has various other uses in the preparation of edibles among which are a spread instead of syrup or pure honey for breads, griddle cakes and the like, "topping" for pies and cakes, for use instead of whipped cream and the like in parfaits, and for sweet impregnated coating for cereal foods, etc. In these special uses where handling with the fingers is not required, I may use larger proportions of honey, substantially as in the nougat, but bring to a temperature only of around 224 degrees Fahrenheit, thereafter cooling and beating as in the case of the fondant composition. As a spread for bread, griddle cakes, etc., the composition must be brought to a consistency which, after beating, will permit same to flow freely in spreading without the stickiness and messiness accompanying like uses of pure honey. For use in impregnating cereal preparations as a sweetening to be applied in a usual manner suitable to the cereal as prepared, it is sometimes preferable to heat and sometimes not. "Breakfast cereal" foods vary in the grain from which prepared and the form as to flakes or otherwise, and in their characteristics as to absorptive qualities and in respect to the method of applying the sweetening thereto. The composition must be varied in treatment by test to suit conditions to be met as is well known to those engaged in the preparation of pre-sweetened cereal foods.

In the use of my honey composition to produce topping or as a substitute for whipped cream in parfaits and the like, I use approximately four times as much honey by weight as lactose and bring to a boil at approximately 224 to 232 degrees Fahrenheit or possibly even higher depending somewhat on the water content of the honey, and add to the basic product a small suitable amount of powdered gelatine and beat thoroughly.

My honey composition is available for uses otherwise where there is a demand for products containing a large proportion of honey in a practicably usable form such as within my present knowledge of such uses, face creams, soaps, tooth pastes, cough drops and the like. In various suitable consistencies, reached upon the principles above stated, waxes, unguents and essences desirable for cleansing creams, may be added to produce the latter; saponaceous ingredients may be added for soaps; powdered chalk and other suitable cleansing ingredients may be added to make tooth pastes; and menthol, eucalyptus and other suitable medicaments for treatment of throat troubles may be added to produce cough drops, etc.

In my honey composition, I endeavor to use as large a proportion of honey as an original ingredient, treated as above, consistent with securing a composition suitable to the uses to which it is to be further applied and in all cases with honey in excess of half of the total of original saccharine ingredients and suitable to produce in its final uses a grained composition, that is one in which a large percentage of the sugar is in a crystalline form, but not of such crystals as not to be "gritty" or "sandy" to the touch or paste when used as above, and of such character as not to unduly, from a commercial standpoint, dry out, become crumbly, or absorb atmospheric moisture and become sticky; in which any excessive cloying sweetness of the honey to the taste shall be eliminated without substantial loss of the attractive and dietetic values of natural honey to the taste or as a cosmetic; without the use of sucrose; and without the use of paraffin, beeswax, gum arabic, albumen and the like undesirable substances to aid in giving body or structural sufficiency to preparations of the general character of such final products. From appearance and without actually analyzing my honey composition, I find that I have attained such purposes to the extent commercially required.

Gelatine and cocoa butter are healtful edibles. I may add cocoa butter in some phases of my honey treatment as above state. Gelatine is not essential to the treatment or to the subsequent specific uses of my honey composition except in the cases above stated; but it is a desirable edible used in the preparation of foods and to carry many other substances, and I find that a small amount of gelatine dissolved in water, the quantity being a matter of determination depending upon experience with the materials available and used, may be added for some uses, particularly as above stated, to advantage and without deleterious effect.

While the use of an acid is not essential to the process of my invention, for some purposes I find that the addition of a small amount of acid to the lactose before mixing into the water, in addition to whatever acid may have been provided by nature in the honey itself, seems to compensate against results of variation in the qualities of the other ingredients, conditions of production, and errors of judgment in performing my process. The acid should not be of such character or amount as to impair the taste where the composition is to be used in the production of edibles or to have any other undesirable effect. Where the acid is used, there may be less possibility of coarser crystals and grittiness in the final product possibly due to some effect on the crystal formation. The addition of a small amount of glycerine to my treated honey in its use in various products seems to tend to improve the smoothness and keeping qualities.

I find that better average results are obtained by the preparation of my honey composition in larger quantities to the extent commercially available and with the equipment available.

I find that I am more certain to get the best results with lactose when the commercial refined product has been finely divided by grinding; but such grinding is not essential to my process if carefully followed. So-called crude lactose varies in characteristics, and such crude lactose as I have been able to obtain has not worked satisfactorily; but it may be possible to use crude lactose in a suitable form.

It will be seen that the underlying principle of the invention is built around the discovery that by properly associating honey with lactose or milk sugar there may be formed a suitable material having all the desirable qualities of the honey but without its undesirable qualities.

While it may not be necessary to give the theoretical explanation of the action of the invention it seems probable that the treatment outlined causes a rearrangement of the ingredients in the mass so that the honey ingredients become associated with materials which cause them to no longer be sticky, tacky, runny or moisture absorbing.

It will be noted that no cane sugar and no corn sugar is employed in the treatment of the present invention reliance being placed substantially entirely on the honey for sweetness desired. The mixture containing the treated honey has a desirable dietetic value, no ingredients being employed which are undesirable from a dietetic standpoint. There is an especial importance in avoiding cane sugar as an ingredient as it is so undesirable as a part of many diets as to be absolutely excluded.

Honey is sweeter than sucrose, dextrose and commercial glucose and is more effective as a sweetening ingredient than the sugars ordinarily used in candy manufacture or for culinary purposes. Lactose on the other hand is less sweet than sucrose, dextrose or commercial glucose and is less effective as a sweetening ingredient than the sugars ordinarily used in candy manufacture or for culinary purposes.

Honey has high nutritive value while lactose has relatively low nutritive value its nutritive value being distinctly less than that of sugars ordinarily used in candy manufacture or for culinary purposes. Lactose also has other desirable characteristics as a food and may produce other beneficial physiological effects. Lactose when eaten may have its own peculiar characteristic digestive reaction and may also be especially important for its effect upon the colon or its contents.

It will be seen that the present invention contemplates the association together of a relatively sweet material with a relatively less sweet material as well as the association together of a material of high nutritive value with a material of low nutritive value also having other beneficial physiological effects.

When ingredients are used which are not pure or of the best grade or not of the character above indicated as preferable the procedure may need to be somewhat varied as will be understood by those versed in the art. The quantities are given for the purpose of indicating preferred proportions. Larger units may be employed and the proportions may be varied somewhat as may the temperatures and other details of procedure.

I claim as my invention:

1. A composition comprising lactose and honey in excess by weight of the lactose as originally employed in a water solution, partly of crystalline and partly of non-crystalline sugar ingredient.

2. A candy having relatively high keeping qualities, which will not leak and break down, which is not soft and does not absorb moisture to a deleterious extent and the sweetening of which comes chiefly from honey and milk sugar.

3. A candy having relatively high keeping qualities, which will not leak and break down, which is not soft and does not absorb moisture to a deleterious extent and the sweetening of which comes chiefly from honey and milk sugar in the proportions of about 4 parts by weight of honey to 3 parts of lactose.

4. A dry substantially solidified food product composed of a relatively large amount of natural honey and a relatively small amount of lactose.

5. The method of treating honey comprising heating to between 220 degrees and 270 degrees Fahrenheit a relatively large amount of honey in an aqueous solution of a relatively small amount of lactose.

6. The method of treating honey comprising mixing about 5 parts by weight of honey and about 3 parts of lactose dissolved in water, heating to about 240 degrees Fahrenheit, adding about 2½ parts of cream and evaporated milk and heating to about 240 degrees Fahrenheit.

7. The method of treating honey comprising mixing about 11 parts by weight of honey and about 4 parts of lactose, heating to about 250 degrees Fahrenheit and stirring in ingredients desired to make a nougat.

8. The method of treating honey comprising mixing about 4 parts by weight of honey and about 1 part of lactose, heating to about 265 degrees Fahrenheit, mixing in about ¼ part of cocoabutter and ½ part of evaporated milk.

9. The method of treating honey comprising heating it with a quantity of lactose less than the quantity of honey in an aqueous solution.

10. A composition containing honey and milk sugar sufficient to reduce the tendency of the honey to crystallize on standing.

11. A composition containing honey and milk sugar sufficient to reduce the tendency of the honey to absorb moisture in undesirable quantities.

12. The method of treating honey comprising subjecting a relatively large amount of honey with an aqueous solution of a relatively small amount of lactose to sufficient heat to render the composition stable.

13. The method of treating honey comprising subjecting a relatively large amount of honey with an aqueous solution of a relatively small amount of lactose to sufficient heat to render the composition stable and beating while cooling.

NELLIE JEAN STRATTON.